United States Patent [19]

Yoneda et al.

[11] 4,207,738
[45] Jun. 17, 1980

[54] EXHAUST GAS PURIFYING SYSTEM FOR MULTI-CYLINDER INTERNAL COMBUSTION ENGINE

[75] Inventors: Kenji Yoneda, Fujisawa; Toshifumi Nishimura, Yokosuka, both of Japan

[73] Assignee: Nissan Motor Company, Limited, Yokohama, Japan

[21] Appl. No.: 880,154

[22] Filed: Feb. 22, 1978

[30] Foreign Application Priority Data

Feb. 25, 1977 [JP] Japan ............... 52-22972[U]

[51] Int. Cl.$^2$ .................. F02M 25/06; F01N 3/10
[52] U.S. Cl. ...................... 60/278; 60/293; 60/306
[58] Field of Search ............. 60/278, 293, 306

[56] References Cited

U.S. PATENT DOCUMENTS

| | | | |
|---|---|---|---|
| 3,662,541 | 5/1972 | Sawada | 60/293 |
| 3,948,044 | 4/1976 | Wakita | 60/305 |
| 4,069,666 | 1/1978 | Nakamura | 60/278 |
| 4,084,373 | 4/1978 | Hashimoto | 60/293 |
| 4,100,734 | 7/1978 | Ozaki | 60/278 |
| 4,133,175 | 1/1979 | Katoh | 60/306 |

FOREIGN PATENT DOCUMENTS

| | | | |
|---|---|---|---|
| 2452556 | 5/1976 | Fed. Rep. of Germany | 60/282 |
| 2632881 | 2/1977 | Fed. Rep. of Germany | 60/293 |
| 2617245 | 7/1977 | Fed. Rep. of Germany | 60/293 |

Primary Examiner—Douglas Hart
Attorney, Agent, or Firm—Schwartz, Jeffery, Schwaab, Mack, Blumenthal & Koch

[57] ABSTRACT

A sufficient amount of secondary air is supplied to the exhaust gases without requiring numerous supply tubes. The supply tubes are connected to the longest branch of the exhaust manifold or the exhaust port passage to which the longest branch is connected where the inertial flow of the exhaust gases is greatest. A mass of the exhaust gases recirculated to the intake through a recirculation tube is prevented from being admixed with the secondary air. The recirculation tube is connected to the branches of the manifold exclusive of the longest branch.

6 Claims, 3 Drawing Figures

4,207,738

EXHAUST GAS PURIFYING SYSTEM FOR MULTI-CYLINDER INTERNAL COMBUSTION ENGINE

BACKGROUND OF THE INVENTION

The present invention relates to an exhaust gas purifying system for a multi-cylinder internal combustion engine, of a type in which pulsations of the exhaust gas pressure are used to induce atmospheric air into the exhaust passageway of the engine.

As is well known in the art, internal combustion engines are provided with exhaust gas purifying systems which feed into exhaust passageways of the engines secondary air for burning or oxidizing noxious burnable components present in the exhaust gases from the engine, by means of a negative pressure of a pulsation of the exhaust gas pressure produced in exhaust passageways and/or so called ejector effect of the engine exhaust gases.

For supplying a sufficient amount of secondary air to support the burning of the noxious components in the exhaust passageway, the exhaust gas purifying system of the foregoing type requires the provision of numerous air supply tubes due to the relatively low flow rate of secondary air induced through each of the tubes. The provision of these numerous tubes makes the system complex in its structure and space-taking in itself, which inevitably involves skillful and meticulous installation work and high production cost.

The conventional exhaust gas purifying system further encounters a drawback, due to the requirement of the provision of the numerous secondary air supply tubes, that the secondary air supplied to the exhaust passageway is likely to be admixed with the mass of the exhaust gases to be recirculated through an exhaust gas recirculation passageway, which causes to diverge from a predetermined value the air/fuel ratio of the air/fuel mixture to be supplied to the engine and therefore causes unstable operation and high fuel consumption of the engine.

In addition to the above, such admixture of the secondary air with the recirculated exhaust gases causes an increase of the combustion temperature in the engine cylinder thus resulting in the reduced emission control effect of the system with respect to the formation of oxides of nitrogen.

SUMMARY OF THE INVENTION

It is accordingly an object of the present invention to provide an improved exhaust gas purifying system for an internal combustion engine, which system is free from the foregoing drawbacks.

It is another object of the present invention to provide an improved exhaust gas purifying system for a multi-cylinder internal combustion engine, which system is constructed and arranged so as to optimally utilize the effect of the inertial flow of the exhaust gases in the exhaust passageway of the engine for thereby increasing the flow rate of secondary air induced through each of the air supply tubes, whereby the system can supply a sufficient amount of secondary air into the exhaust passageway without requiring the provision of numerous secondary air supply tubes.

It is a further object of the present invention to provide an improved exhaust gas purifying system of the foregoing type, which system is optimally constructed and arranged to prevent secondary air from being admixed with the mass of the exhaust gases to be recirculated through an exhaust gas recirculation passageway.

BRIEF DESCRIPTION OF THE DRAWINGS

These and other objects and advantages of the present invention will become more apparent from the following description taken in conjunction with the accompanying drawings in which.

DETAILED DESCRIPTION OF PREFERRED EMBODIMENT

Figure 1:
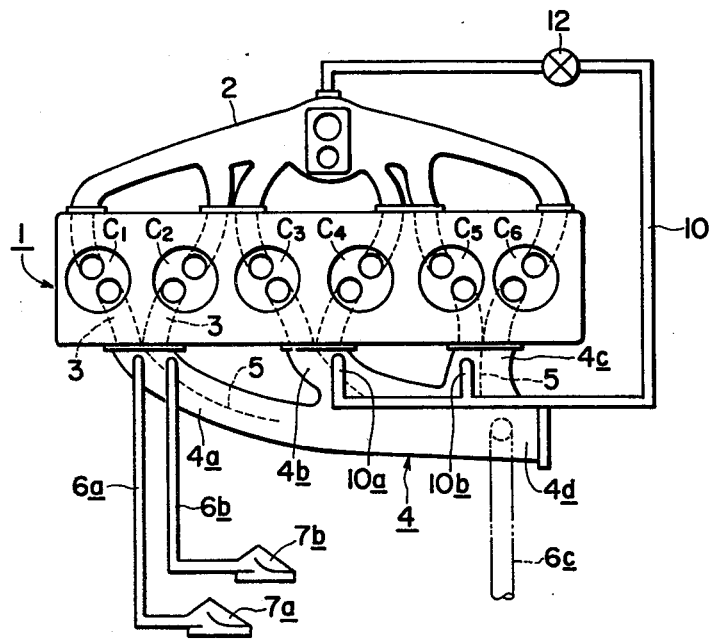
FIG. 1 is a schematic view of a preferred embodiment of an exhaust gas purifying system according to the invention in combination with a six-cylinder internal combustion engine.
Figure 2:
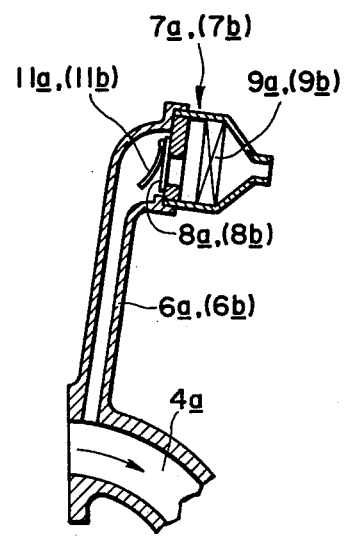
FIG. 2 is an enlarged sectional view showing the details of a secondary air supply tube and a reed valve assembly which are incorporated in the exhaust gas purifying system of FIG. 1.
Figure 3:
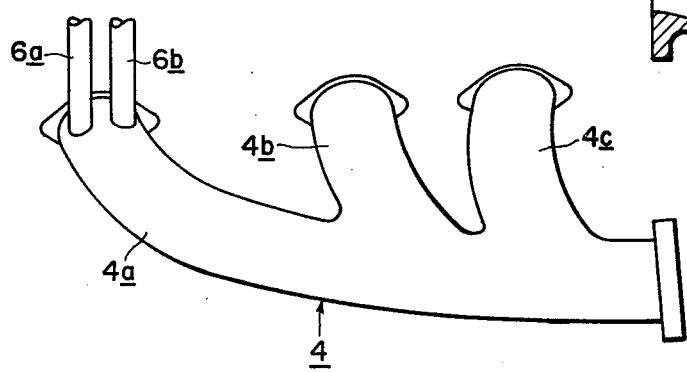
FIG. 3 is a perspective view showing how secondary air supply tubes incorporated in the secondary air supply system of FIG. 1 are arranged in relation to an exhaust manifold of the engine of FIG. 1.

Referring now to FIGS. 1 to 3 inclusive, an exhaust gas purifying system of this invention is shown, only for purposes of illustration, as the type for use in a six-cylinder internal combustion engine 1. The internal combustion engine 1 is provided, as usual, with combustion chambers $C_1$, $C_2$, $C_3$, $C_4$, $C_5$ and $C_6$, intake conduit means including an intake manifold 2 for supply of a mixture of air and fuel to the engine, and exhaust conduit means including an exhaust port passage 3 connected to each combustion chamber and an exhaust manifold 4 for discharge of the exhaust gases from the engine. As clearly shown in FIG. 1, the exhaust port passage 3 is arranged in such a manner that it converges with the neighboring exhaust port passage 3 as it extends from its inlet end, where it is connected to the corresponding combustion chamber, to its outlet end where it is connected to the exhaust manifold 4. The exhaust manifold 4 comprises branches 4a, 4b and 4c and a common trunk or conduit 4d into which the branches 4a, 4b and 4c discharge. Each of the branches is formed with, in its interior, a partition wall 5, as illustrated by broken line in FIG. 1, to define two exhaust passages fuidly separated from each other. Each of these two exhaust passages respectively communicates with one of the two adjacent exhaust port passages 3. The exhaust manifold 4 with a structure as above is preferably cast as one piece. In the embodiment illustrated, the branch 4a has a length different from other branches and is longest among the branches, viz., the branch 4a is extended from the common conduit 4d over a distance farther than the other branches 4b and 4c. The branch 4a can be otherwise defined as the branch which is in communication with the combustion chamber closest to the front end of the in-line engine 1 or as the branch which has the inlet remotest from the outlet of the manifold 4.

In this instance, two secondary air supply tubes 6a and 6b are connected to the branch 4a, which is the longest branch among the branches of the exhaust manifold 4, at a location thereof as close as possible to the junction of the exhaust port passages 3, for the reason which will be appreciated as the explanation proceeds. In relation to the two exhaust passages separated by the partition wall 5, the secondary air supply tubes 6a and 6b are arranged in such a manner that each secondary air supply tube communicates with a corresponding one of the two exhaust passages formed in the branch 4a. Reed valve assemblies 7a and 7b are respectively mounted in the secondary air supply tubes 6a and 6b at one end thereof opposite to the ends where they are connected to the branch 4a. Each of the reed valve assemblies 7a and 7b comprises a reed valve 8a or 8b which operates as a one-way valve to periodically open and close in response to the pulsations of the exhaust gas pressure in the exhaust conduit means for thereby intermittently allowing atmospheric air to flow into the exhaust gases in said exhaust conduit means through the secondary air supply tubes 6a and 6b, and a filter 9a or 9b for filtration of atmospheric air passed therethrough to the read valve 8a or 8b. Designated by the reference numeral 11a or 11b is a stopper for limiting the flexure of the reed valve 8a or 8b.

In this instance, as shown specifically in FIGS. 2 and 3, the secondary air supply tubes 6a and 6b are connected to the branch 4a in such a manner that the extension of the axis of each secondary air supply tube intersects the axis of the branch approximately at right angles or in such a manner that the axis of the connected end portion of each secondary air supply tube is approximately perpendicular to the interior wall of the branch so that they take thereinto the static pressure of the exhaust gases in the exhaust manifold 4.

It is desirable to control the amount of secondary air supplied to the exhaust gases in the exhaust conduit means in such a manner that a total air/fuel ratio of about 16:1 or more than 16:1 is effected when the secondary air is added. The expression "total air/fuel ratio" designates the ratio of total air (intake air + secondary air) to fuel, by weight. To this end, when a sufficient amount of secondary air necessary for attaining a desirable total air/fuel ratio is not obtained by the above two secondary air supply tubes 6a and 6b, an additional secondary air tube 6c is connected to the common conduit 4d of the exhaust manifold 4 downstream of the secondary air supply tubes 6a, 6b as illustrated by phantom lines in FIG. 1.

The internal combustion engine 1 is further provided with exhaust gas recirculation means including an exhaust gas recirculation tube 10 for reducing the formation of oxides of nitrogen during combustion by partial recirculation of the exhaust gases in the exhaust conduit means back to the intake conduit means. In this embodiment, the exhaust gas recirculation tube 10 comprises exhaust intake branches 10a and 10b. For the purpose of preventing secondary air from being admixed with the mass of the exhaust gases to be recirculated, these branches 10a and 10b are respectively connected to the branches 4b and 4c exclusive of the branch 4a to which are connected the secondary air supply tubes 6a and 6b and furthermore arranged such that they taken thereinto the exhaust gases from the exhaust manifold 4 at the location thereof upstream of the secondary air supply tube 6c. Designated by the reference numeral 12 is an exhaust gas recirculation control valve of a type well known in the art for controlling the recirculation of the exhaust gases through the recirculation tube 10 in accordance with the operating conditions of the engine.

The exhaust gas purifying system of this invention will be further explained, particularly in relation to the operation thereof, as follows:

The magnitude of the pressure in the exhaust manifold 4 varies, as is known, periodically in time, and there are time intervals in which a negative pressure is established in the exhaust manifold. To allow atmospheric air to flow into the exhaust conduit means through the secondary air supply tubes 6a and 6d, the exhaust gas purifying system of this invention utilizes, as basically similar to the conventional exhaust gas purifying system, said negative pressure by means of reed valves 8a and 8b which are opened as soon as the secondary air supply tubes 6a and 6b in which the valves are mounted have a negative pressure in their interior, with valves being closed as soon as the tubes 6a and 6b have a positive pressure therein, to prevent the exhaust gases from escaping to the atmosphere.

In this regard, the negative pressure is created in the exhaust conduit means, particularly in the exhaust port passage 3 and the exhaust manifold 4, mainly by the inertial flow of the exhaust gases. That is, when the exhaust valve (not shown) of the engine 1 opens, a mass of the exhaust gases is discharge into the exhaust conduit means and travels therethrough at a considerably high speed by the inertial flow even after the exhaust valve is closed. Due to the mass of the exhaust gases which continues to travel after the exhaust valve has been closed, a negative pressure is created in a part of the exhaust conduit means when the mass of the exhaust gases has passed.

The magnitude of this negative pressure varies in dependence on the inertial flow of the exhaust gases, viz., the absolute value of the negative pressure created in the exhaust conduit means increases as the inertial flow of the exhaust gases increases. When the negative pressure with an increased absolute value is used for induction of secondary air, the flow rate of secondary air through each secondary air supply tube is increased.

In view of these facts, the exhaust gas purifying system according to the present invention is constructed and arranted to maximally or optimally utilize the inertial flow of the exhaust gases.

The inertial flow of the exhaust gases is greatest in the branch 4a, among the branches of the exhaust manifold 4 of the embodiment illustrated, which is constructed and arranged such that the exhaust gas flow through the branch 4a is least liable to interfere with some other possible exhaust gas flow in the exhaust manifold 4 and which has a relatively small flow resistance, viz., the inertial flow of the exhaust gases is greatest in the branch 4a which is longest among the branches of the exhaust manifold 4 and has a gradually curved configuration or a configuration extending almost straight along the axis of the common conduit 4d of the exhaust manifold 4. Therefore, a negative pressure of an optimally large absolute value is created in the branch 4a.

Accordingly, since the secondary air supply tubes 6a and 6b are connected to the branch 4a, the flow rate of secondary air induced through each of the tubes is increased as compared to the conventional exhaust gas purifying system, whereby the exhaust gas purifying system of this invention can additionally supply a sufficient amount of secondary air into the exhaust conduit means without requiring the provision of numerous secondary air supply tubes.

The above optimal utilization of the inertial flow of the exhaust gases can be otherwise attained by a modified arrangement (though not shown) of connecting the secondary air supply tubes 6a and 6b respectively to the exhaust port passages 3 to which the branch 4a is connected, instead of connecting same to the branch 4a as illustrated in FIG. 1.

The reed valves 8a and 8b are opened in response to a negative pressure in the branch 4a to allow atmospheric air to be drawn into the branch 4a via the filters 9a and 9b and are closed in response to a positive pressure in the branch 4a to prevent the exhaust gases from escaping toward the atmosphere.

In this instance, although the secondary air supply tubes 6a and 6b are connected to the branch 4a through which the exhaust gases only from the combustion chambers $C_1$ and $C_2$ travel, the pressure wave of the pulsating exhaust gas pressure caused by the discharge of the exhaust gases from other combustion chambers $C_3$, $C_4$, $C_5$ and $C_6$ is transmitted to the branch 4a at the speed of sound. The reed valves 8a and 8b are thus operable to open and close further in response to this pulsating exhaust gas pressure created by the discharge of the exhaust gases from the combustion chambers $C_3$, $C_4$, $C_5$ and $C_6$. The negative pressure in the branch 4a, in this case, is relatively small in absolute value, as will be understood from the description relating to the inertial flow of the exhaust gases, and thus the flow rate of secondary air into the exhaust manifold 4 is temporarily reduced. However, since the secondary air supply tubes 6a and 6b are arranged so as to optimally utilize the inertial flow of the exhaust gases, the average flow rate of secondary air through each of the tubes 6a and 6b is elevated to a considerably high level as compared to such secondary air supply tube if connected to the branch 4b 4c. In other words, the exhaust gas purifying system which is provided with secondary air supply tubes connected to the branch 4a can supply a considerably increased amount of secondary air into the exhaust conduit means as compared to the system which is provided with secondary air supply tubes corresponding in number to the former system but connected to the branches 4b and/or 4c.

The secondary air supply tubes 6a and 6b are connected to the branch 4a in such a manner that the extension of the axis of each secondary air supply tube intersects the axis of the branch 4a approximately at right angles so that the tubes 6a and 6b can take thereinto the static pressure of the pulsating exhaust gas pressure. Experiments conducted by the inventors have revealed that this arrangement is quite advantageous for increasing the flow rate of secondary air through each of the tubes as compared to the arrangement in which a secondary air supply tube opens into the exhaust conduit means through an opening facing toward the direction opposite to the flow of the exhaust gases, viz., a dynamic pressure of the pulsating exhaust gas pressure is induced into the tube of the latter arrangement.

Due to the location of secondary air supply tubes, the provision of secondary air supply tubes to the branches 4b and 4c becomes unnecessary. The exhaust gas recirculation tube 10 is then connected to the braches 4b and 4c exclusive of the branch 4a. By this arrangement, the mass of the recirculated exhaust gases is assuredly prevented from containing secondary air. This is quite advantageous for attaining stable operation and low fuel consumption of the engine. Because, if the mass of the recirculated exhaust gases contains therein a mass of secondary air, the actual exhaust gas recirculation rate is varied by the effect of the mass of secondary air admixed. This may practically result in an air/fuel ratio of an air/fuel mixture to the engine deviating from a predetermined value and therefore causes unstable operation and high fuel consumption by the engine.

From the foregoing description, it is to be appreciated that the exhaust gas purifying system according to this invention is quite advantageous for supplying a sufficient amount of secondary air into the exhaust gases with a limited number of secondary air supply tubes since the system of this invention is adapted to optimally utilize the effect of the inertial flow of the exhaust gases in the exhaust conduit means, whereby the secondary air supply system is simple in its structure and therefore of reduced production cost while being effective in the efficient reduction of the amount of unburned constituents in the exhaust gases emitted into the environment.

It is to be further appreciated that the exhaust gas purifying system according to this invention is quite advantageous for attaining stable operation and low fuel consumption of the engine and for reducing the formation of oxides of nitrogen since the system is optimally constructed and arranged to prevent secondary air from being admixed with the mass of the exhaust gases to be recirculated through an exhaust gas recirculation system into the intake.

What is claimed is:

1. An exhaust gas purifying system for a multi-cylinder internal combustion engine having a plurality of combustion chambers, comprising:
   exhaust conduit means for discharging of the exhaust gases from said combustion chambers, said exhaust conduit means including a plurality of exhaust port passages respectively in communication with the combustion chambers and an exhaust manifold in communication with said exhaust port passages, said exhaust manifold having a plurality of branches which lead from said exhaust port passages and merge into a common portion, said branches including a longest branch which extends over a distance longer than the other branch(es) before merging into said common portion;
   secondary air supply conduit means for conducting atmospheric air into said exhaust conduit means; and
   reed valve means mounted in said secondary air supply conduit means and operable to periodically open and close in response to the pulsations of the exhaust gas pressure in said exhaust gas conduit means for thereby intermittently allowing atmospheric air to flow into the exhaust gases in said exhaust gas conduit means through said secondary air supply conduit means,
   wherein said secondary air supply conduit means is connected to said exhaust conduit means in such a way as to introduce secondary air only into said longest branch.

2. An exhaust gas purifying system as claimed in claim 1, in which said longest branch includes a wall having an inner surface and said secondary air supply conduit means comprises a conduit end portion which is connected to said longest branch in such a way that the axis of said conduit end portion is substantially perpendicular to the inner surface of the wall of said longest branch.

3. An exhaust gas purifying system for a multi-cylinder internal combustion engine having a plurality of combustion chambers, comprising:
   intake conduit means for supplying a mixture of air and fuel to said combustion chambers;
   exhaust conduit means for discharging the exhaust gases from said combustion chambers, said exhaust conduit means including a plurality of exhaust port passages respectively in communication with the combustion chambers and an exhaust manifold in communication with said exhaust port passages, said exhaust manifold having a plurality of branches which lead from said exhaust port passages and merge into a common portion, said branches including a longest branch which extends over a distance longer than the other branch(es) before merging into said common portion;

exhaust gas recirculation conduit means interconnecting said exhaust conduit means and said intake conduit means for recirculating a part of the exhaust gases in said exhaust conduit means back to said intake conduit means, said exhaust gas recirculation conduit means being connected only to said branches of the exhaust manifold exclusive of said longest branch;

secondary air supply conduit means for conducting atmospheric air into said exhaust conduit means;

reed valve means mounted in said secondary air supply conduit means and operable to periodically open and close in response to the pulsations of the exhaust gas pressure in said exhaust conduit means for thereby intermittently allowing atmospheric air to flow into the exhaust gases in said exhaust conduit means through said secondary air supply conduit means; and wherein said secondary air supply conduit means is connected to said exhaust conduit means in such a way as to introduce secondary air only into said longest branch.

4. An exhaust gas purifying system for a multi-cylinder internal cimbustion engine having a plurality of combustion chambers, comprising:

intake conduit means for supplying a mixture of air and fuel to said combustion chambers;

exhaust conduit means for discharging the exhaust gases from said combustion chambers, said exhaust conduit means including a plurality of exhaust port passages respectively in communication with the combustion chambers and an exhaust manifold in communication with said exhaust port passages, said exhaust manifold having a plurality of branches which lead from said exhaust port passages and merge into a common portion, said branches including a longest branch which extends over a distance longer than the other branch(es) before merging into said common portion, each of said branches having formed therein two exhaust passages, each of which communicates with one of said exhaust port passages;

exhaust gas recirculation conduit means interconnecting said exhaust conduit means and said intake conduit means for recirculating a part of the exhaust gases in said exhaust conduit means back to said intake conduit means, said exhaust gas recirculating conduit means being connected only to said branches of the exhaust manifold exclusive of said longest branch;

secondary air supply conduit means for conducting atmospheric air into said exhaust conduit means, reed valve means mounted in said secondary air supply conduit means and operable to periodically open and close in response to the pulsations of the exhaust gas pressure in said exhaust conduit means for thereby intermittently allowing atmospheric air to flow into the exhaust gases in said exhaust conduit means through said secondary air supply conduit means;

wherein said secondary air supply conduit means is connected to said exhaust conduit means in such a way as to introduce secondary air only into said longest branch; and in which said secondary air supply conduit means includes two secondary air supply tubes which are respectively connected to the two exhaust passages formed in said longest branch and the two exhaust port passages to which said longest branch is connected.

5. An exhaust gas purifying system as claimed in claim 4, in which said reed valve means includes two independent reed valves which are connected to said two secondary air supply tubes, respectively.

6. An exhaust gas purifying system as claimed in claim 4, in which said secondary air supply conduit means further includes an additional secondary air supply tube which is connected to said common portion of the exhaust manifold.

* * * * *